(12) United States Patent
Ahn et al.

(10) Patent No.: US 9,837,664 B2
(45) Date of Patent: Dec. 5, 2017

(54) ELECTRODE WITH ENHANCED CYCLE LIFE AND LITHIUM SECONDARY BATTERY INCLUDING THE SAME

(71) Applicant: LG Chem, Ltd., Seoul (KR)

(72) Inventors: Kyoung Ho Ahn, Daejeon (KR); Min Jung Kim, Daejeon (KR); Jung Hoon Lee, Daejeon (KR); Yi Jin Jung, Daejeon (KR); Doo Kyung Yang, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 193 days.

(21) Appl. No.: 14/482,006

(22) Filed: Sep. 10, 2014

(65) Prior Publication Data

US 2015/0017530 A1 Jan. 15, 2015

Related U.S. Application Data

(63) Continuation of application No. PCT/KR2014/006195, filed on Jul. 10, 2014.

(30) Foreign Application Priority Data

Jul. 10, 2013 (KR) .................. 10-2013-0081006
Jul. 10, 2014 (KR) .................. 10-2014-0086599

(51) Int. Cl.
*H01M 4/62* (2006.01)
*H01M 4/04* (2006.01)
(Continued)

(52) U.S. Cl.
CPC .............. *H01M 4/62* (2013.01); *C08G 18/02* (2013.01); *C08G 18/3812* (2013.01);
(Continued)

(58) Field of Classification Search
CPC .......... H01M 4/0404; H01M 10/0525; H01M 4/622; H01M 4/62; H01M 10/052;
(Continued)

(56) References Cited

U.S. PATENT DOCUMENTS 6,576,372 B1 * 6/2003 Hata .................... C08G 18/285
252/62.2
2006/0246354 A1 11/2006 Lee et al.
(Continued)

FOREIGN PATENT DOCUMENTS

JP H05159799 6/1993
JP 2005044681 A 2/2005
(Continued)

OTHER PUBLICATIONS

Asahi Kasei Web page http://www.akcpc.jp/en/duranate/ichiran. html accessed on Jan. 23, 2017 in pdf attached.*
(Continued)

*Primary Examiner* — Jonathan Jelsma
*Assistant Examiner* — Omar Kekia
(74) *Attorney, Agent, or Firm* — Lerner, David, Littenberg, Krumholz & Mentlik, LLP

(57) ABSTRACT

The present invention relates to an electrode for a secondary battery including an electrode current collector, an electrode active material combination layer formed on one or both sides of the electrode current collector, and a polyurethane-based coating layer formed on the electrode active material combination layer, and a lithium secondary battery including the same.

10 Claims, 1 Drawing Sheet

(51) Int. Cl.

| | |
|---|---|
| *H01M 4/1391* | (2010.01) |
| *H01M 4/1393* | (2010.01) |
| *H01M 4/36* | (2006.01) |
| *C09D 5/00* | (2006.01) |
| *C08G 18/02* | (2006.01) |
| *C08G 18/62* | (2006.01) |
| *C08G 18/76* | (2006.01) |
| *C08G 18/79* | (2006.01) |
| *C08G 18/80* | (2006.01) |
| *C09D 175/04* | (2006.01) |
| *C08G 18/38* | (2006.01) |
| *H01M 4/131* | (2010.01) |
| *H01M 4/133* | (2010.01) |
| *H01M 4/525* | (2010.01) |
| *H01M 4/587* | (2010.01) |
| *H01M 10/0525* | (2010.01) |
| *C08K 3/22* | (2006.01) |

(52) U.S. Cl.
CPC ..... *C08G 18/6279* (2013.01); *C08G 18/7621* (2013.01); *C08G 18/792* (2013.01); *C08G 18/8025* (2013.01); *C09D 5/00* (2013.01); *C09D 175/04* (2013.01); *H01M 4/0404* (2013.01); *H01M 4/0471* (2013.01); *H01M 4/131* (2013.01); *H01M 4/133* (2013.01); *H01M 4/1391* (2013.01); *H01M 4/1393* (2013.01); *H01M 4/364* (2013.01); *H01M 4/366* (2013.01); *H01M 4/628* (2013.01); C08K 2003/2203 (2013.01); C08K 2003/2262 (2013.01); C08K 2003/2289 (2013.01); C08K 2003/2293 (2013.01); *H01M 4/525* (2013.01); *H01M 4/587* (2013.01); *H01M 10/0525* (2013.01)

(58) Field of Classification Search
CPC .. H01M 4/366; H01M 4/1393; H01M 4/1391; H01M 4/139; H01M 4/587; H01M 4/13; H01M 4/525; Y02E 60/122; Y02T 10/7011; C09D 5/00; C09D 175/04; C08G 18/02; C08G 18/6279; C08G 18/7621; C08G 18/792; C08G 18/8025; C08G 18/3812; C08K 2003/2203; C08K 2003/2262; C08K 2003/2289; C08K 2003/2293
USPC ...................................... 429/215; 427/58, 57
See application file for complete search history.

(56) References Cited

U.S. PATENT DOCUMENTS

| | | |
|---|---|---|
| 2006/0251956 A1 | 11/2006 | Kim et al. |
| 2010/0029185 A1* | 2/2010 | Fukuda ................ B24B 37/24 451/527 |
| 2011/0052953 A1 | 3/2011 | Saito et al. |
| 2012/0189915 A1 | 7/2012 | Cho et al. |
| 2013/0330609 A1 | 12/2013 | Sawa et al. |
| 2013/0330610 A1 | 12/2013 | Shigematsu et al. |
| 2014/0287323 A1 | 9/2014 | Lu et al. |

FOREIGN PATENT DOCUMENTS

| | | | |
|---|---|---|---|
| JP | 2005259641 A | 9/2005 | |
| JP | 2011048987 A | 3/2011 | |
| JP | 2011222531 A | 11/2011 | |
| JP | 2012-182130 A | 9/2012 | |
| JP | 2013051195 A | 3/2013 | |
| JP | 2015505861 A | 2/2015 | |
| KR | 20010092193 A | 10/2001 | |
| KR | 10-0368752 B1 | 1/2003 | |
| KR | 2006-0110235 A | 10/2006 | |
| KR | 2006-0110782 A | 10/2006 | |
| KR | 2012-0084652 A | 7/2012 | |
| KR | 20160032545 A | 3/2016 | |
| WO | 2012108270 A1 | 8/2012 | |
| WO | WO2013/062997 * | 5/2013 | ............. H01M 4/62 |

OTHER PUBLICATIONS

International Search Report from PCT/KR2014/006195 dated Oct. 15, 2014.
Partial Search Report from European Application No. 14757819.9, dated Jun. 3, 2016.
Extended search report from European Application No. 14757819.9, dated Jul. 21, 2016.

* cited by examiner

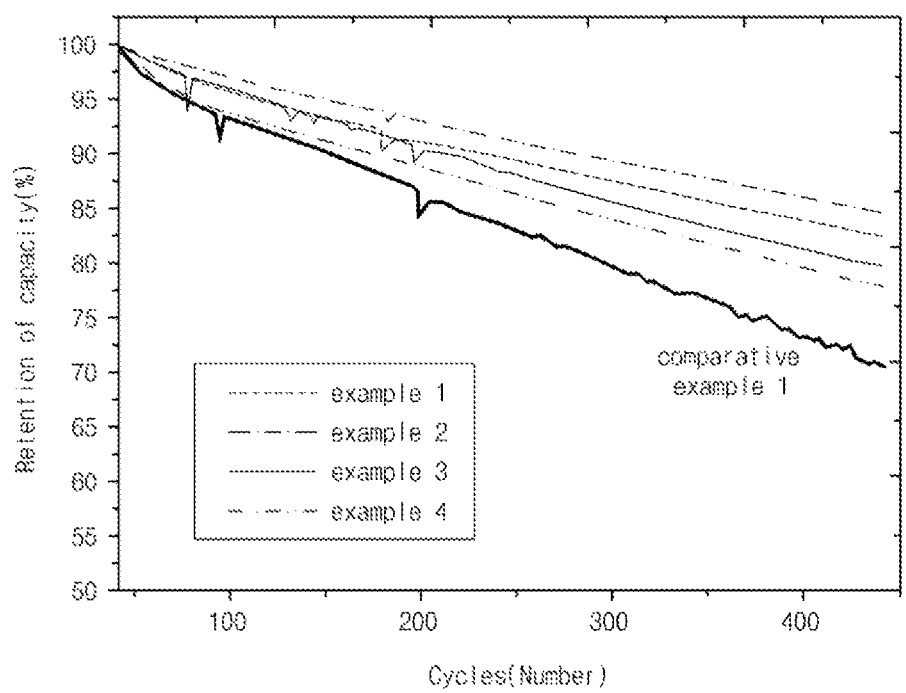

US 9,837,664 B2

ELECTRODE WITH ENHANCED CYCLE LIFE AND LITHIUM SECONDARY BATTERY INCLUDING THE SAME

CROSS-REFERENCE TO RELATED APPLICATIONS

The present application is a continuation of International Application No. PCT/KR2014/006195 filed Jul. 10, 2014, which claims priority from Korean Patent Application Nos. 10-2013-0081006 filed on Jul. 10, 2013 and 10-2014-0086599 filed on Jul. 10, 2014, in the Korean Intellectual Property Office, all of which are incorporated herein by reference.

BACKGROUND OF THE INVENTION

Field of the Invention

The present invention relates to an electrode for a secondary battery having improved cycle life by including a polyurethane-based coating layer on the surface thereof, and a lithium secondary battery including the same.

Description of the Related Art

Efforts for studying and developing a battery are materialized as the applying field of energy storage technique is increased to a cellular phone, a camcorder and a laptop PC, and besides, an electric vehicle. In that, electrochemical devices receive much attention, and above all, the development of a chargeable and rechargeable secondary battery is the focus of attention.

Among secondary batteries applied nowadays, a lithium ion secondary battery developed in the early 1990s has advantages such as high working voltage and high energy density when compared to a common battery such as a Ni-MH battery, a Ni—Cd battery, a sulfuric acid-lead battery, etc, using an aqueous electrolyte.

Recently, researches for developing an electrode for a secondary battery having improved capacity density, performance and cycle life, and a battery including the same are on the rise.

SUMMARY OF THE INVENTION

An aspect of the present invention provides an electrode for a secondary battery having improved cycle life by additionally forming a polyurethane-based coating layer on the surface thereof, and a method of manufacturing the same.

Another aspect of the present invention provides a lithium secondary battery including the electrode for a secondary battery manufactured by the above-described method.

According to an aspect of the present invention, there is provided an electrode for a secondary battery including an electrode current collector, an electrode active material combination layer formed on one or both sides of the electrode current collector, and a polyurethane-based coating layer formed on the electrode active material combination layer.

In this case, the electrode active material combination layer is formed by using an oxide containing at least one hydroxyl group (—OH), and the polyurethane-based coating layer may be formed by urethane bonding reaction of the hydroxyl group (—OH) at the surface of the electrode active material combination and an isocyanate compound.

According to another aspect of the present invention, there is provided a method of forming an electrode for a secondary battery including preparing a coating solution by dissolving an isocyanate-based compound in a non-aqueous organic solvent; coating an electrode slurry mixture layer on an electrode current collector to form a first electrode; and coating the first electrode with the coating solution by immersing the first electrode in the coating solution, and drying to form a second electrode including a polyurethane-based coating layer formed thereon.

According to another aspect of the present invention, there is provided a method of forming an electrode for a secondary battery including forming an electrode active material combination including an electrode active material and an isocyanate-based compound; coating the electrode active material combination on an electrode current collector; and drying the electrode active material combination to form an electrode including a polyurethane-based coating layer formed thereon.

In addition, according to another aspect of the present invention, there is provided a lithium secondary battery including the electrode for a secondary battery formed by the above method is provided.

According to the present invention, a secondary battery having improved cycle life may be manufactured by forming a polyurethane-based coating layer on the surface of an electrode.

BRIEF DESCRIPTION OF THE DRAWINGS

FIG. 1 is a graph illustrating cycles of secondary batteries according to example 1~4 and comparative example 1 with respect to the retention of capacity.

DETAILED DESCRIPTION OF THE PREFERRED EMBODIMENT

Exemplary embodiments of the present invention will now be described in detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art Particularly, in an embodiment of the invention, an electrode for a secondary battery including an electrode current collector, an electrode active material combination layer formed on one or both sides of the electrode current collector, and a polyurethane-based coating layer formed on the electrode active material combination layer is provided.

In the electrode of the present invention, the electrode may be a cathode, an anode or both electrodes of them. Thus, the electrode current collector may be at least one of a cathode current collector and an anode current collector.

Particularly, the cathode current collector may be formed by using any material not inducing chemical change of a battery and having high conductivity without limitation, and may be, for example, stainless steel, aluminum, nickel, titanium, baked carbon, or a surface treated aluminum or stainless steel with carbon, nickel, titanium, silver etc. In this case, the cathode current collector may have various shapes including a film, a sheet, a foil, a porous body, a foamed body, a non-woven fabric, etc. including minute embossing formed on the surface thereof to increase adhesiveness with a cathode active material.

In addition, the anode current collector may be formed by using any material not inducing chemical change of a battery and having conductivity without limitation. For example, copper, stainless steel, aluminum, nickel, titanium, baked carbon, or a surface treated copper or stainless steel with carbon, nickel, titanium, silver etc., an aluminum-cadmium alloy, or the like may be used. Similarly, the anode current collector may have various shapes including a film, a sheet, a foil, a porous body, a foamed body, a non-woven fabric, etc. including minute embossing formed on the surface thereof.

In addition, in an electrode of the present invention, the electrode active material combination layer may be formed by using an oxide including at least one hydroxyl group (—OH), which may be used during forming a cathode or an anode of a common secondary battery.

Particularly, when the electrode active material combination is a cathode active material mixture, the oxide may be one lithium transition metal oxide selected from the group consisting of a lithium cobalt-based oxide, a lithium manganese-based oxide, a lithium copper oxide, a vanadium oxide, a lithium nickel-based oxide, a lithium manganese complex oxide, and a lithium-nickel-manganese-cobalt-based oxide. More particularly, the oxide may be a lithium manganese oxide such as $Li_{1+x}Mn_{2-x}O_4$ (where x is 0 to 0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, $Cu_2V_2O_7$ etc.; a lithium nickel oxide represented by $LiNi_{1-x}M_xO_2$ (where M=Co, Mn, Al, Cu, Fe, Mg, B or Ga, and x=0.01 to 0.3); a lithium manganese complex oxide represented by $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); and a lithium-nickel-manganese-cobalt-based oxide represented by $Li(Ni_aCo_b\text{-}Mn_c)O_2$ (where 0<a<1, 0<b<1, 0<c<1, a+b+c=1). However, the present invention is not limited thereto.

In the case that the electrode active material combination is the anode active material mixture, the oxide may be a lithium-containing titanium complex oxide (LTO) which may easily absorb and release lithium ions, or an oxide (MeOx) of a metal (Me) selected from the group consisting of Si, Sn, Li, Zn, Mg, Cd, Ce, Ni and Fe. Particularly, a metal complex oxide such as $Li_xFe_2O_3$ ($0 \leq x \leq 1$), $Li_xWO_2$ ($0 < x \leq 1$), and $Sn_xMe_{1-x}Me'_yO_z$ (Me:Mn, Fe, Pb, Ge; Me':Al, B, P, Si, elements in Group 1, Group 2, and Group 3, halogens; $0<x\leq1$; $1\leq y\leq3$; $1\leq z\leq8$); and oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, etc. may be used. In addition, a carbon-based anion active material such as crystalline carbon, amorphous carbon or a carbon composite may be used alone or as a mixture thereof. In an embodiment of the present invention, a carbon powder may be used.

In this case, the electrode active material combination may additionally include a binder resin, a conductive agent, a filler and other additives.

The binder resin is a component assisting the bonding of the electrode active material and the conductive agent and the bonding to the current collector, and is commonly added by 1 to 50 wt % based on the total amount of the electrode mixture. The binder resin may include, for example, polyvinylidene fluoride (PVdF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, a styrene-butadiene rubber, a fluorine rubber, diverse copolymers thereof, etc.

The conductive agent is a component further improving the conductivity of the electrode active material, and may be added by 1 to 20 wt % based on the total amount of the electrode mixture. The conductive agent is not specifically limited only if not inducing chemical change of a battery and having conductivity. For example, graphite such as natural graphite or synthetic graphite; carbon blacks such as carbon black, acetylene black, ketchen black, channel black, furnace black, lamp black, thermal black, etc.; a conductive fiber such as a carbon fiber, a metal fiber, etc.; a metal powder of carbon fluoride, aluminum, nickel, etc.; conductive whisker such as zinc oxide, potassium titanate, etc.; conductive metal oxide such as titanium oxide, etc.; polyphenylene derivatives, etc. may be used.

The filler is a component restraining the expansion of the electrode and is selectively used. The filler is not specifically limited only if not inducing chemical change of a battery and being a fibrous material. For example, an olefin-based polymer such as polyethylene, polypropylene, etc.; a fibrous material such as a glass fiber, a carbon fiber, etc. may be used.

In addition, in an electrode of the present invention, the polyurethane-based coating layer may be formed through urethane bonding reaction between the hydroxyl group (R'—OH) of the electrode active material combination layer and an isocyanate-based compound (See the following Reaction Formula 1).

R'—NCO+HO—R"→R'NH—COO—R"  [Reaction Formula 1]

Particularly, the polyurethane-based coating layer may be formed by i) immersing an electrode coated with an electrode active material combination layer in a coating solution in which an isocyanate-based compound is dissolved, or ii) directly coating an electrode active material combination including an electrode active material and an isocyanate-based compound on an electrode current collector. In addition, the polyurethane-based coating layer may be present as an independent phase on the surface of the electrode active material combination and on the surface of the binder for connecting and fixing the electrode active material.

In this case, the isocyanate-based compound is a compound having good reactivity with the surface of the active material as a thin film state and having a structure that may easily make a coordinate bond with Li ions. Particularly, one among the compounds represented by the following Formulae 1 to 4 may be use.

[Formula 1]

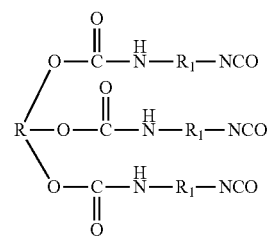

[Formula 2]

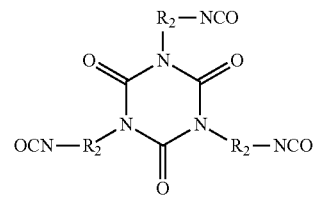

-continued

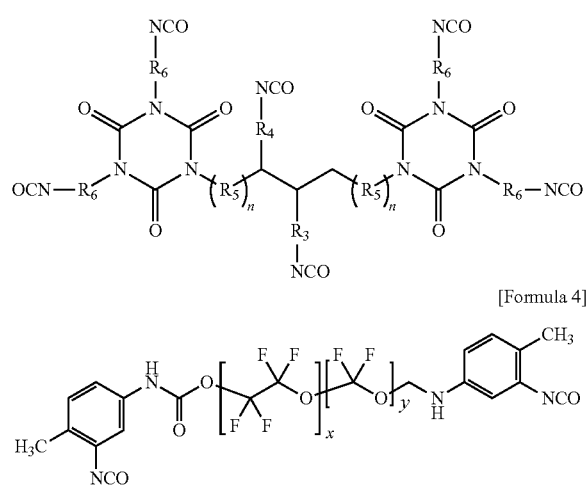

[Formula 3]

[Formula 4]

In the above Formulae 1 to 4, R is a substituted or unsubstituted alkyl group or alkylene group having 1 to 10 carbon atoms, Each of $R_1$ to $R_6$ independently represents a substituted or unsubstituted alkyl group or alkylene group having 1 to 10 carbon atoms, each of x and y is an integer from 5 to 1,000, and n is an integer from 1 to 3.

Particularly, the isocyanate compound may include anyone among the compounds represented by the following Formulae 2a to 4a.

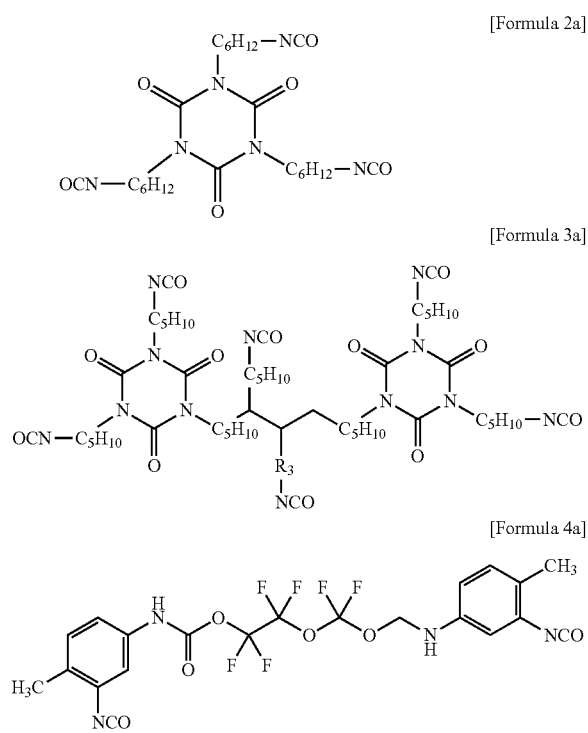

[Formula 2a]

[Formula 3a]

[Formula 4a]

In addition, an embodiment of the present invention provides a method of forming an electrode for a secondary battery (1) including preparing a coating solution by dissolving an isocyanate-based compound in a non-aqueous organic solvent; coating an electrode slurry mixture layer on an electrode current collector to form a first electrode; and coating the first electrode with the coating solution by immersing the first electrode in the coating solution, and drying to form a second electrode including a polyurethane-based coating layer formed thereon.

In this case, the isocyanate-based compound may be included by 0.5 to 10 wt % based on 100 wt % of the total amount of the coating solution. In the case that the amount of the isocyanate compound is less than 0.5 wt %, the forming effect of the polyurethane-based coating layer is insignificant, and the improving effect of cycle life is low. In the case that the amount exceeds 10 wt %, the thickness of the coating layer may be increased, or the amount ratio of the electrode active material may be relatively decreased, thereby decreasing the capacity of the secondary battery.

In addition, in the method of the present invention, the non-aqueous organic solvent may include NMP, DMC or EMC.

In the method of the present invention, the drying may be performed by drying at room temperature or under heat drying conditions.

In addition, an embodiment of the present invention provides a method of forming an electrode for a secondary batter (2) including forming an electrode active material combination including an electrode active material and an isocyanate-based compound; coating the electrode active material combination on an electrode current collector; and drying the electrode active material combination to form an electrode including a polyurethane-based coating layer formed thereon.

In this case, the isocyanate-based compound may be included by 0.0001 to 10 parts by weight based on 100 parts by weight of the total amount of the electrode active material. In the case that the amount of the isocyanate compound is less than 0.0001 parts by weight, the forming effect of the polyurethane-based coating layer is insignificant, and the improving effect of cycle life is low. In the case that the amount exceeds 10 parts by weight, the thickness of the coating layer may be increased, or the amount ratio of the electrode active material may be relatively decreased, thereby decreasing the capacity of the secondary battery.

In the method of the present invention, the drying may be performed at room temperature, or heat drying may be performed to improve the forming effect of the polyurethane-based coating layer.

As described above, according to the present invention, the cycle life of a battery may be improved by maintaining the porous structure formed between the particles of the electrode active material, by providing an electrode further including a polyurethane-based coating layer on the surface of thereon and by stabilizing at electrode interface.

In this case, the electrode may include porosity of 1 to 50% in the electrode active material, and the polyurethane-based coating layer may be formed to a thickness of about 0.001 to 10 μm without inducing any adverse effect to the porosity.

In addition, the present invention provides a lithium secondary battery including a cathode, an anode, a separator disposed between both electrodes and an electrolyte, wherein the cathode, the anode or the both electrodes are the electrode of the present invention.

A cathode active material, an anode active material, a separator, etc. composing the battery of the present invention may be commonly used elements during the manufacture of a lithium secondary battery.

Among the elements, the separator may be a common porous polymer film which is a commonly used separator, for example, a porous polymer film formed by using a polyolefin-based polymer such as an ethylene single polymer, a propylene single polymer, an ethylene/butene copolymer, an ethylene/hexene copolymer and an ethylene/methacrylate copolymer may be used. The porous polymer film may be used alone or by stacking two or more. Alternatively, a commonly used porous non-woven fabric, for example, a glass fiber having a high melting point, a non-woven fabric of a polyethyleneterephthalate fiber, etc. may be used, without limitation.

The appearance of the lithium secondary battery of the present invention is not specifically limited, and may include a cylindrical type using a can, a prismatic type, a pouch type or a coin type.

EXAMPLES

Example 1

Forming Electrode Through Immersing in Coating Solution (Forming Cathode)

94 wt % of Li $(Ni_{0.6}CO_{0.2}Mn_{0.2})O_2$ as a cathode active material, 3 wt % of carbon black as a conductive agent, and 3 wt % of PVdF as a binding agent were added in an N-methyl-2-pyrrlidone (NMP) solvent to prepare a cathode mixture slurry. The cathode mixture slurry was coated on an aluminum (Al) thin film, that is, a cathode current collector having a thickness of 20 μm and dried to form a cathode including pores.

Then, an isocyanate compound (1 wt %) represented by the above Formula 2a was dissolved in a carbonate solution at about 30° C. for about 1 hour to prepare a coating solution.

Subsequently, the cathode thus formed was immersed in the coating solution for about 1 to 3 minutes until the bubbles in the pores were completely exhausted out by a dip coating method, and dried under vacuum at room temperature. After drying, the cathode was cured in a hot air oven under the conditions of 100° C./10 minutes, to finally form a cathode in which a polyurethane-based coating layer was formed on the surface of the particles of the electrode active material.

(Forming Anode)

96 wt % of a carbon powder as an anode active material, 2 wt % of Super-P (a conductive agent), and 2 wt % of PVdF (a binding agent) were added in NMP to prepare an anode mixture slurry. The anode mixture slurry was coated on one side of a copper foil, dried and pressurized to form an anode.

Then, 1 wt % of an isocyanate compound represented by the above Formula 2a was dissolved in a carbonate solution at about 30° C. for about 1 hour to prepare a coating solution.

Subsequently, the anode thus formed was immersed in the coating solution for about 1 to 3 minutes until the bubbles in the pores were completely exhausted out by a dip coating method, and dried under vacuum at room temperature. After drying, the anode was cured in a hot air oven under the conditions of 100° C./10 minutes, to finally form an anode in which a polyurethane-based coating layer was formed on the surface of the particles of the electrode active material.

(Fabricating Battery)

After assembling the two electrodes thus formed and a separator composed of three layers of polypropylene/polyethylene/polypropylene (PP/PE/PP) by a stacking method, an electrolyte [weight ratio of ethylene carbonate (EC)/ethyl methyl carbonate (EMC)=30/70, 1 mol of $LiPF_6$] was injected to finally complete a battery.

Example 2

Forming Electrode by Immersing in Coating Solution

A cathode and an anode were formed by performing the same method as described in the above Example 1 except that a compound represented by the above Formula 3a was used instead of the compound represented by the above Formula 2a as the isocyanate-based compound, and a battery was fabricated by using the cathode and the anode.

Example 3

Forming Electrode by Immersing in Coating Solution

A cathode and an anode were formed by performing the same method as described in the above Example 1 except that a compound represented by the above Formula 4a was used instead of the compound represented by the above Formula 2a as the isocyanate-based compound, and a battery was fabricated by using the cathode and the anode.

Example 4

Forming Electrode by Immersing in Slurry (Forming Cathode)

94 wt % of Li $(Ni_{0.6}CO_{0.2}Mn_{0.2})O_2$ as a cathode active material, 3 wt % of carbon black as a conductive agent, 3 wt % of PVdF as a binding agent and 1 wt % of an isocyanate compound represented by the above Formula 2a were added in an N-methyl-2-pyrrolidone (NMP) solvent to prepare a cathode mixture slurry. The cathode mixture slurry was coated on an aluminum (Al) thin film, that is, a cathode current collector having a thickness of 20 μm and dried to form a cathode.

(Forming Anode)

96 wt % of a carbon powder as an anode active material, 3 wt % of PVdF as a binding agent, 1 wt % of carbon black as a conductive agent and 0.5 wt % of an isocyanate compound represented by the above Formula 2a were added in NMP to prepare an anode mixture slurry. The anode mixture slurry was coated on one side of a copper (Cu) thin film, that is, an anode current collector having a thickness of 10 μm and dried to form an anode.

(Fabricating Battery)

After assembling the two electrodes thus formed and a separator composed of three layers of polypropylene/polyethylene/polypropylene (PP/PE/PP) by a stacking method, an electrolyte [weight ratio of ethylene carbonate (EC)/ethyl methyl carbonate (EMC)=30/70, 1 mol of $LiPF_6$] was injected to finally complete a battery.

Comparative Example 1

Forming Cathode 94 wt % of $Li(Ni_{0.6}Co_{0.2}Mn_{0.2})O_2$ as a cathode active material, 3 wt % of carbon black as a conductive agent, and 3 wt % of PVdF as a binding agent were added in NMP to prepare a cathode mixture slurry. The cathode mixture slurry was coated on an aluminum (Al) thin film, that is, a cathode current collector having a thickness of 20 μm and dried to form a cathode including pores.
(Forming Anode)
96 wt % of a carbon powder as an anode active material, 2 wt % of Super-P (a conductive agent), and 2 wt % of PVdF (a binding agent) were added in NMP to prepare an anode mixture slurry. The anode mixture slurry was coated on one side of a copper foil, dried and pressurized to form an anode.
(Fabricating Battery)
After assembling the two electrodes thus formed and a separator composed of three layers of polypropylene/polyethylene/polypropylene (PP/PE/PP) by a stacking method, an electrolyte [weight ratio of ethylene carbonate (EC)/ethyl methyl carbonate (EMC)=30/70, 1 mol of $LiPF_6$] was injected to finally complete a battery.

Experimental Example 1

Measuring of Capacity Change of Battery
The secondary batteries having capacity of 15.5 mAh and fabricated in Examples 1 to 4 and Comparative Example 1 were aged at room temperature for 1 day and charged at room temperature with 0.1 C rate for 240 minutes. Subsequently, aging was performed at 60° C. for 1 day. Degassing/resealing processes were performed, charging at constant current/constant voltage conditions was performed to 4.2 V with 1 C at room temperature, and discharging at constant current conditions was performed to 3.0 V with 1 C. This is referred to as initial charging and discharging. Initial discharge capacities of Examples 1 to 4 and Comparative Example 1 are illustrated in the following Table 1.

TABLE 1

|  | Initial capacity (1 C) |
| --- | --- |
| Example 1 | 14.3 mAh |
| Example 2 | 13.9 mAh |
| Example 3 | 15.1 mAh |
| Example 4 | 14.6 mAh |
| Comparative Example 1 | 14.8 mAh |

After the initial charging and discharging of the secondary batteries of Examples 1 to 4 and Comparative Example 1, 400 cycles or more of charging and discharging was performed at the same voltage region (1 C rate). Then, the retention of capacity with respect to the initial discharge capacity was confirmed and the results are illustrated in FIG. 1.

As shown in FIG. 1, the retention of capacity of the secondary batteries of Examples 1 to 4 after 450 cycles with 1 C was 78 to 87%. The discharge capacity was maintained relatively stable for 450 cycles when charged and discharged with 1 C. On the contrary, the secondary battery of Comparative Example 1 without the polyurethane-based coating layer has lower retention of capacity (70%) at $450^{th}$ cycle when compared to that of Examples 1 to 4, and the retention of capacity was rapidly decreased from $200^{th}$ cycle, as shown in FIG. 1. Through the above experimental results, it may be confirmed that the secondary batteries of Examples 1 to 4 maintain the pore structure formed between the particles of the electrode active material, and the polyurethane-based coating layer formed on the surface of the electrode stabilize the electrode interface, thereby improving the cycle life of a battery.

Accordingly, it may be confirmed that the secondary batteries of Examples 1 to 4 exhibit good retention of capacity and cycle life when compared to those of Comparative Example 1.

While the present invention has been shown and described in connection with the exemplary embodiments, it will be apparent to those skilled in the art that modifications and variations can be made without departing from the spirit and scope of the invention as defined by the appended claims.

The invention claimed is:

1. An electrode for a secondary battery, comprising:
   an electrode current collector;
   an electrode active material combination layer formed on one or both sides of the electrode current collector; and
   a polyurethane-based coating layer formed on the electrode active material combination layer,
   wherein the polyurethane-based coating layer is formed by urethane bonding reaction of a hydroxyl group (R'—OH) in the electrode active material combination layer and an isocyanate compound, and
   wherein the isocyanate compound is one compound represented by the following Formula 3a or Formula 4a:

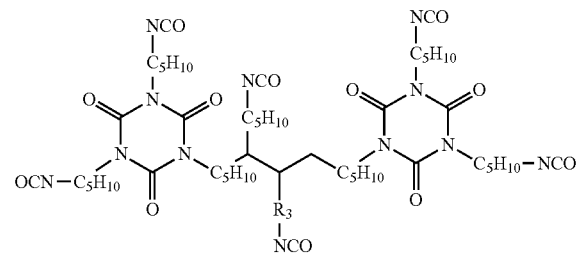

[Formula 3a]

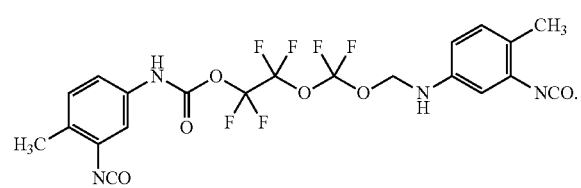

[Formula 4a]

2. The electrode for a secondary battery of claim 1, wherein the electrode is a cathode, an anode or both electrodes thereof.

3. A lithium secondary battery comprising a cathode, an anode, a separator disposed between the cathode and the anode, and an electrolyte,
   wherein at least one of the cathode, the anode, and both electrodes thereof includes the electrode according to claim 1.

4. A method of forming an electrode for a secondary battery, the method comprising:
   preparing a coating solution by dissolving an isocyanate-based compound in a non-aqueous organic solvent;
   coating an electrode slurry mixture layer on an electrode current collector to form a first electrode; and
   coating the first electrode with the coating solution by immersing the first electrode in the coating solution, and drying to form a second electrode including a polyurethane-based coating layer formed thereon,
   wherein the isocyanate compound is one compound represented by the following Formula 3a or Formula 4a:

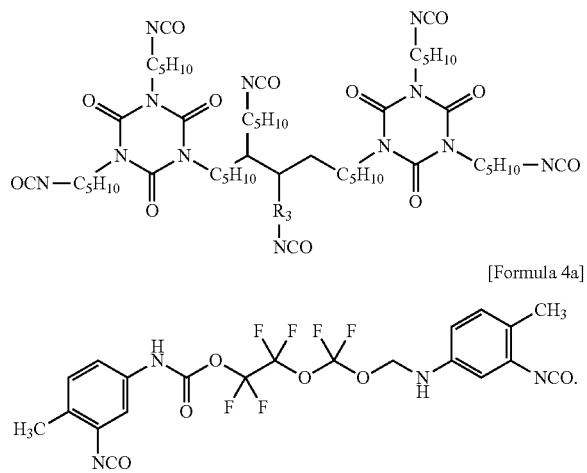

[Formula 3a]

[Formula 4a]

5. The method of forming an electrode for a secondary battery of claim 4, wherein the isocyanate-based compound is included by 0.5 to 10 wt % in 100 wt % of a total amount of the coating solution.

6. The method of forming an electrode for a secondary battery of claim 4, wherein the non-aqueous organic solvent comprises NMP, DMC or EMC.

7. The method of forming an electrode for a secondary battery of claim 4, wherein the drying is performed at room temperature or under heat drying conditions.

8. A method of forming an electrode for a secondary battery, the method comprising:
   forming an electrode active material combination comprising an electrode active material and an isocyanate-based compound;
   coating the electrode active material combination on an electrode current collector; and
   drying the electrode active material combination to form an electrode including a polyurethane-based coating layer formed thereon,
   wherein the isocyanate compound is one compound represented by the following Formula 3a or Formula 4a:

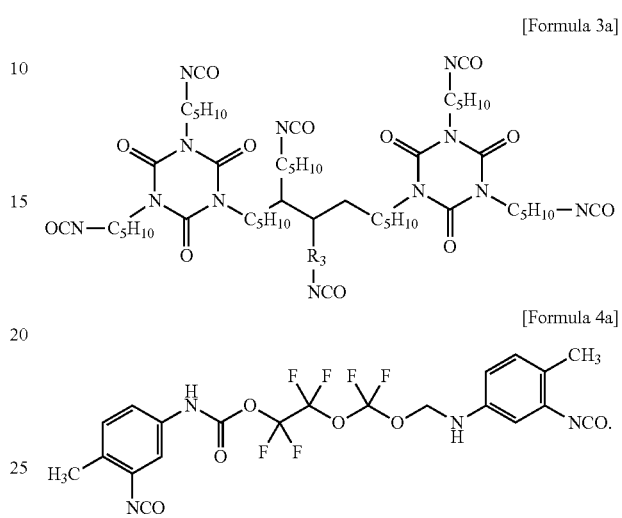

[Formula 3a]

[Formula 4a]

9. The method of forming an electrode for a secondary battery of claim 8, wherein the isocyanate-based compound is included by 0.0001 to 10 parts by weight based on 100 parts by weight of a total amount of the electrode active material mixture.

10. The method of forming an electrode for a secondary battery of claim 8, wherein the drying is performed at room temperature or under heat drying conditions.

* * * * *